(12) United States Patent
Palermo et al.

(10) Patent No.: US 11,086,650 B2
(45) Date of Patent: Aug. 10, 2021

(54) TECHNOLOGIES FOR APPLICATION-SPECIFIC NETWORK ACCELERATION WITH UNIFIED COHERENCY DOMAIN

(71) Applicant: Intel Corporation, Santa Clara, CA (US)

(72) Inventors: Stephen T. Palermo, Chandler, AZ (US); Gerald Rogers, Chandler, AZ (US); Shih-Wei Roger Chien, Shanghai (CN); Namakkal Venkatesan, Portland, OR (US); Rajesh Gadiyar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 242 days.

(21) Appl. No.: 15/904,371

(22) Filed: Feb. 25, 2018

(65) Prior Publication Data
US 2019/0042292 A1 Feb. 7, 2019

Related U.S. Application Data

(60) Provisional application No. 62/553,608, filed on Sep. 1, 2017.

(51) Int. Cl.
*G06F 9/455* (2018.01)
*G06F 13/16* (2006.01)
(Continued)

(52) U.S. Cl.
CPC ........ *G06F 9/45558* (2013.01); *G06F 9/3877* (2013.01); *G06F 9/45529* (2013.01); *G06F 9/50* (2013.01); *G06F 12/0811* (2013.01); *G06F 12/0815* (2013.01); *G06F 12/0875* (2013.01); *G06F 13/1668* (2013.01); *G06F 13/4022* (2013.01); *G06F 13/4027* (2013.01);
(Continued)

(58) Field of Classification Search
None
See application file for complete search history.

(56) References Cited

U.S. PATENT DOCUMENTS

2018/0198840 A1* 7/2018 Chandran ........... H04L 43/0852

FOREIGN PATENT DOCUMENTS

WO    WO-2015099719 A1 * 7/2015    ............... G06F 1/10

* cited by examiner

*Primary Examiner* — Lewis A Bullock, Jr.
*Assistant Examiner* — Melissa A Headly
(74) *Attorney, Agent, or Firm* — Hanley, Flight & Zimmerman, LLC

(57) ABSTRACT

Technologies for application-specific network acceleration include a computing device including a processor and an accelerator device such as a field-programmable gate array (FPGA). The processor and the accelerator device are coupled via a coherent interconnect and may be included in a multi-chip package. The computing device binds a virtual machine executed by the processor with an application function unit of the accelerator device via the coherent interconnect. The computing device processes network application data with the virtual machine and the application function unit within a coherency domain maintained with the coherent interconnect. Processing the network data may include processing a packet of a network flow by the virtual machine and processing subsequent packets of the network flow by the application function unit. Other embodiments are described and claimed.

16 Claims, 6 Drawing Sheets

(51) Int. Cl.
*G06F 13/40* (2006.01)
*G06F 13/42* (2006.01)
*G06F 12/0815* (2016.01)
*G06F 12/0875* (2016.01)
*G06F 12/0811* (2016.01)
*G06F 9/50* (2006.01)
*G06F 9/38* (2018.01)

(52) U.S. Cl.
CPC ...... *G06F 13/4068* (2013.01); *G06F 13/4282* (2013.01); *G06F 2009/4557* (2013.01); *G06F 2009/45579* (2013.01); *G06F 2009/45595* (2013.01); *G06F 2213/0026* (2013.01); *G06F 2213/0058* (2013.01); *G06F 2213/0064* (2013.01)

TECHNOLOGIES FOR APPLICATION-SPECIFIC NETWORK ACCELERATION WITH UNIFIED COHERENCY DOMAIN

CROSS-REFERENCE TO RELATED APPLICATION

The present application claims the benefit of U.S. Provisional Patent Application No. 62/553,608, filed Sep. 1, 2017.

BACKGROUND

Modern computing devices may include general-purpose processor cores as well as a variety of hardware accelerators for performing specialized tasks. Certain computing devices may include one or more field-programmable gate arrays (FPGAs), which may include programmable digital logic resources that may be configured by the end user or system integrator. In some computing devices, an FPGA may be used to perform network packet processing tasks instead of using general-purpose compute cores.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
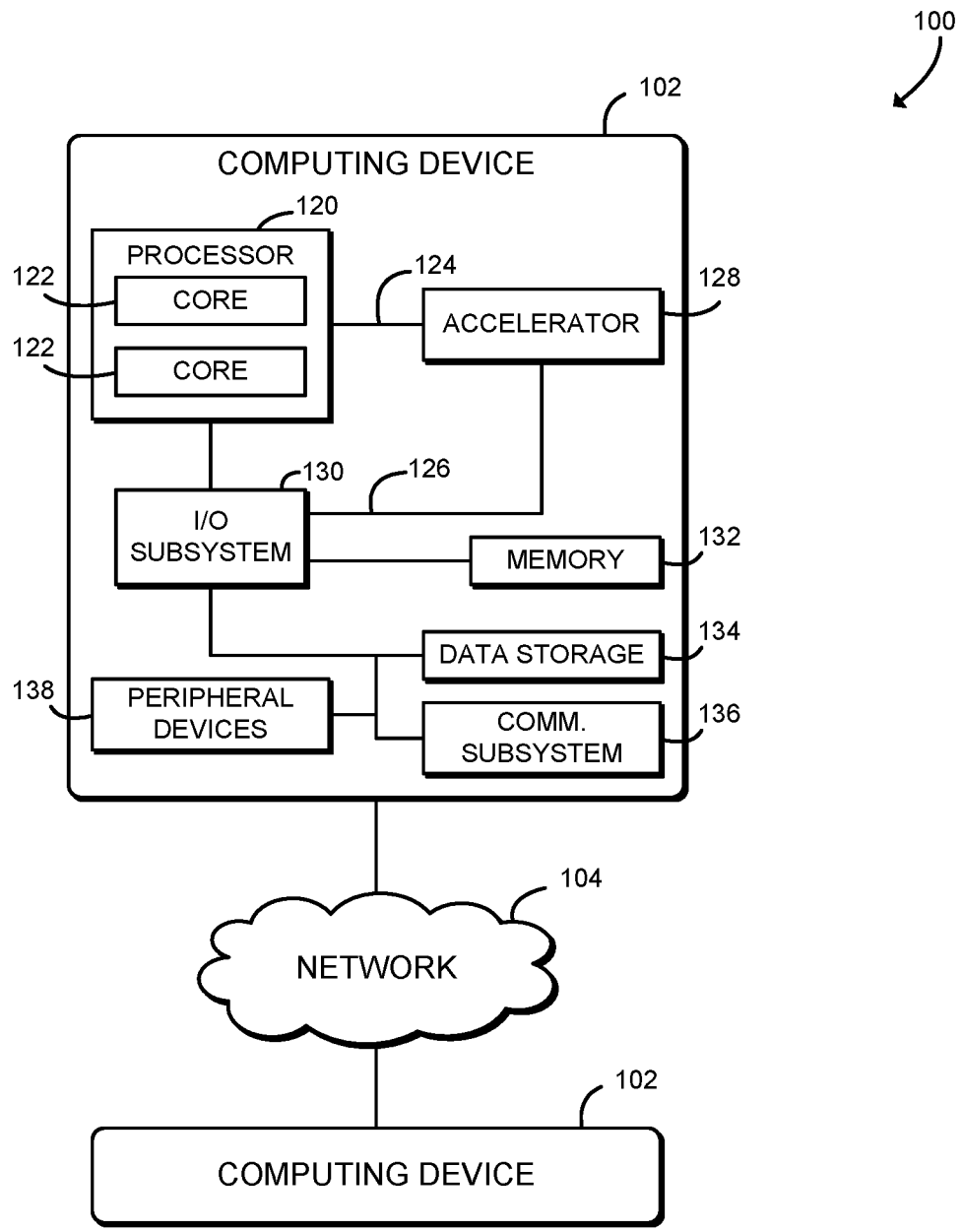
FIG. 1 is a simplified block diagram of at least one embodiment of a system for application-specific network acceleration.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for application-specific network acceleration includes multiple computing devices 102 in communication over a network 104. Each computing device 102 has a processor 120 and an accelerator device 128, such as a field-programmable gate array (FPGA) 128. The processor 120 and the accelerator device 128 are coupled by a coherent interconnect 124 and a non-coherent interconnect 126. In use, as described below, a computing device 102 provisions one or more virtual network functions (VNFs) or other virtual machines (VMs) and binds each VM to an accelerated function unit (AFU) of the accelerator device 128 via the coherent interconnect 124 or the non-coherent interconnect 126. For example, a VM with a need for deterministic acceleration may use the coherent interconnect 124. Using the coherent interconnect 124 allows the VM and the AFU to process network data within a single coherency domain, which may improve performance for certain network workloads. Thus, the computing device 102 may scale to accommodate higher throughput while supporting multiple application specific networking workloads. Additionally, the computing device 102 may also support multiple virtual instances on the same server with different network latency and performance characteristics, which may improve server resource utilization. Accordingly, the computing device 102 may allow for multi-tenant VM provisioning including separate accelerated functions that allow simultaneous network traffic processing of internal network traffic and external network traffic.

Each computing device 102 may be embodied as any type of computation or computer device capable of performing the functions described herein, including, without limitation, a computer, a server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 102 illustratively include the processor 120, the accelerator device 128, an input/output subsystem 130, a memory 132, a data storage device 134, and a communication subsystem 136, and/or other components and devices commonly found in a server or similar computing device. Of course, the computing device 102 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 132, or portions thereof, may be incorporated in the processor 120 in some embodiments.

The processor 120 may be embodied as any type of processor capable of performing the functions described herein. Illustratively, the processor 120 is a multi-core processor 120 having two processor cores 122. Of course, in other embodiments the processor 120 may be embodied as a single or multi-core processor(s), digital signal processor, microcontroller, or other processor or processing/controlling circuit. Similarly, the memory 132 may be embodied as any type of volatile or non-volatile memory or data storage capable of performing the functions described herein. In operation, the memory 132 may store various data and software used during operation of the computing device 102 such operating systems, applications, programs, libraries, and drivers. The memory 132 is communicatively coupled to the processor 120 via the I/O subsystem 130, which may be embodied as circuitry and/or components to facilitate input/output operations with the processor 120, the accelerator device 128, the memory 132, and other components of the computing device 102. For example, the I/O subsystem 130 may be embodied as, or otherwise include, memory controller hubs, input/output control hubs, sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 130 may form a portion of a system-on-a-chip (SoC) and be incorporated, along with the processor 120, the memory 132, and other components of the computing device 102, on a single integrated circuit chip.

The data storage device 134 may be embodied as any type of device or devices configured for short-term or long-term storage of data such as, for example, memory devices and circuits, memory cards, hard disk drives, solid-state drives, non-volatile flash memory, or other data storage devices. The computing device 102 also includes the communication subsystem 136, which may be embodied as any communication circuit, device, or collection thereof, capable of enabling communications between the computing device 102 and other remote devices over the computer network 104. For example, the communication subsystem 136 may be embodied as or otherwise include a network interface controller (NIC) for sending and/or receiving network data with remote devices. The communication subsystem 136 may be configured to use any one or more communication technology (e.g., wired or wireless communications) and associated protocols (e.g., Ethernet, InfiniBand®, Bluetooth®, Wi-Fi®, WiMAX, 3G, 4G LTE, etc.) to effect such communication.

As shown in FIG. 1, the computing device 102 includes an accelerator device 128. The accelerator device 128 may be embodied as a field-programmable gate array (FPGA), an application-specific integrated circuit (ASIC), a coprocessor, or other digital logic device capable of performing accelerated network functions. Illustratively, as described further below in connection with FIG. 2, the accelerator device 128 is an FPGA included in a multi-chip package with the processor 120. The accelerator device 128 may be coupled to the processor 120 via multiple high-speed connection interfaces including the coherent interconnect 124 and one or more non-coherent interconnects 126.

The coherent interconnect 124 may be embodied as a high-speed data interconnect capable of maintaining data coherency between a last-level cache of the processor 120, any cache or other local memory of the accelerator device 128, and the memory 132. For example, the coherent interconnect 124 may be embodied as an in-die interconnect (IDI), Intel® UltraPath Interconnect (UPI), QuickPath Interconnect (QPI), or other coherent interconnect. The non-coherent interconnect 126 may be embodied as a high-speed data interconnect that does not provide data coherency, such as a peripheral bus (e.g., a PCI Express bus), a fabric interconnect such as Intel Omni-Path Architecture, or other non-coherent interconnect. Additionally or alternatively, it should be understood that in some embodiments, the coherent interconnect 124 and/or the non-coherent interconnect 126 may be merged to form an interconnect that is capable of serving both functions. In some embodiments, the computing device 102 may include multiple coherent interconnects 124, multiple non-coherent interconnects 126, and/or multiple merged interconnects.

The computing device 102 may further include one or more peripheral devices 138. The peripheral devices 138 may include any number of additional input/output devices, interface devices, and/or other peripheral devices. For example, in some embodiments, the peripheral devices 138 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

The computing devices 102 may be configured to transmit and receive data with each other and/or other devices of the system 100 over the network 104. The network 104 may be embodied as any number of various wired and/or wireless networks. For example, the network 104 may be embodied as, or otherwise include, a wired or wireless local area network (LAN), and/or a wired or wireless wide area network (WAN). As such, the network 104 may include any number of additional devices, such as additional computers, routers, and switches, to facilitate communications among the devices of the system 100. In the illustrative embodiment, the network 104 is embodied as a local Ethernet network.

Figure 2:
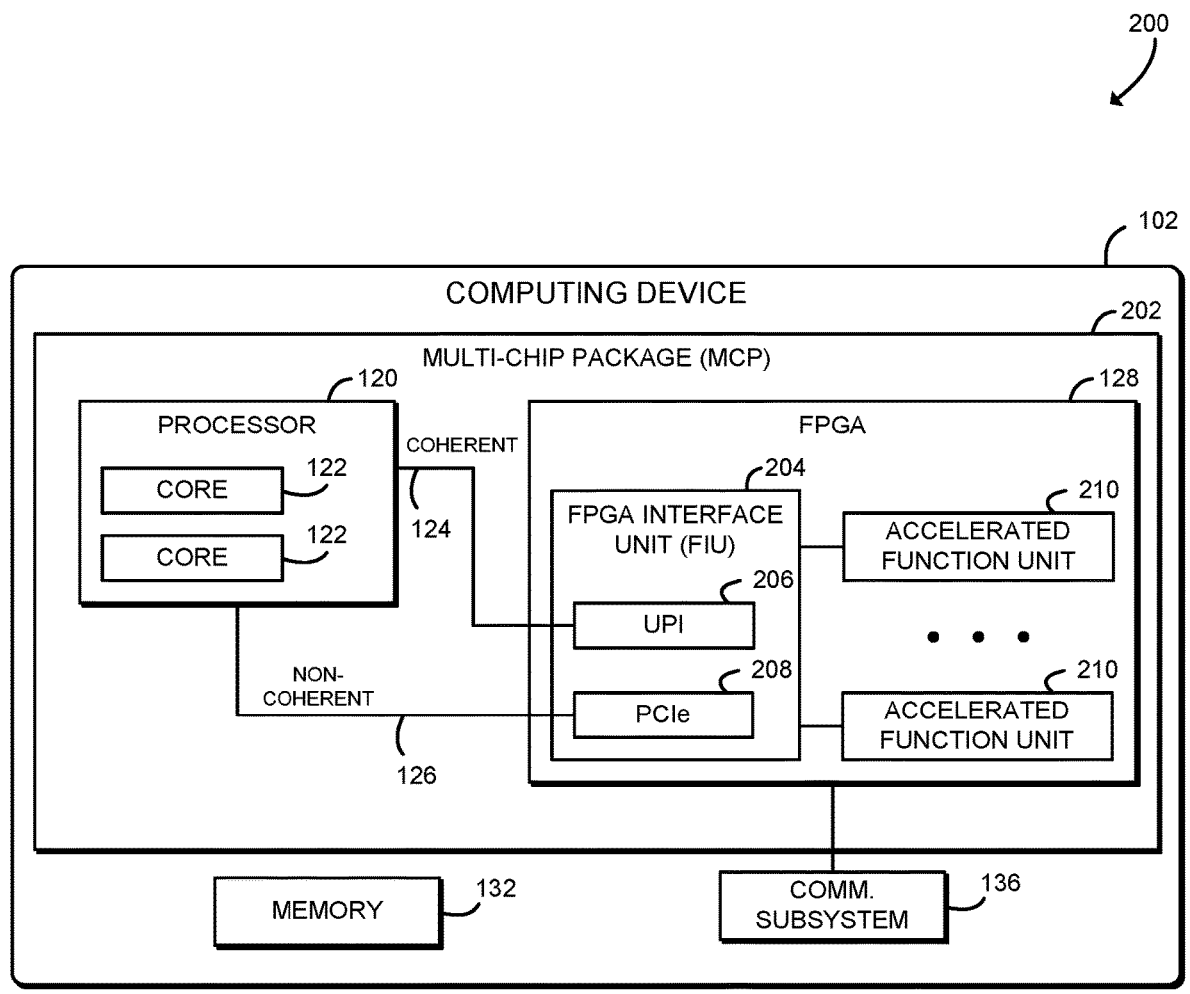
FIG. 2 is a simplified block diagram of at least one embodiment of a computing device of the system of FIG. 1.

Referring now to FIG. 2, diagram 200 illustrates one potential embodiment of a computing device 102. As shown, the computing device 102 includes a multi-chip package (MCP) 202. The MCP 202 includes the processor 120 and the accelerator device 128, as well as the coherent interconnect 124 and the non-coherent interconnect 126. Illustratively, the accelerator device 128 is an FPGA, which may be embodied as an integrated circuit including programmable digital logic resources that may be configured after manufacture. The FPGA 128 may include, for example, a configurable array of logic blocks in communication over a configurable data interchange. As shown, the computing device 102 further includes the memory 132 and the communication subsystem 136. The FPGA 128 is coupled to the communication subsystem 136 and thus may send and/or receive network data. Additionally, although illustrated in FIG. 2 as discrete components separate from the MCP 202, it should be understood that in some embodiments the memory 132 and/or the communication subsystem 136 may also be incorporated in the MCP 202.

As shown, the FPGA 128 includes an FPGA interface unit (FIU) 204, which may be embodied as digital logic resources that are configured by a manufacturer, vendor, or other entity associated with the computing device 102. The FIU 204 implements the interface protocols and manageability for links between the processor 120 and the FPGA 128. In some embodiments, the FIU 204 may also provide platform capabilities, such as Intel Virtualization Technology for directed I/O (Intel VT-d), security, error monitoring, performance monitoring, power and thermal management, partial reconfiguration, etc. As shown, the FIU 204 further includes an UltraPath Interconnect (UPI) block 206 coupled to the coherent interconnect 124 and a PCI Express (PCIe) block 208 coupled to the non-coherent interconnect 126. The UPI block 206 and the PCIe block 208 may be embodied as digital logic configured to transport data between the FPGA 128 and the processor 120 over the physical interconnects 124, 126, respectively. The physical coherent UPI block 206 and the physical non-coherent block 208 and their associated interconnects may be multiplexed as a set of virtual channels (VCs) connected to a VC steering block.

The FPGA 128 further includes multiple accelerated function units (AFUs) 210. Each AFU 210 may be embodied as digital logic configured to perform one or more accelerated networking functions. For example, each AFU 210 may be embodied as smart NIC logic that performs one or more network workloads (e.g., user-designed custom data path logic such as forwarding, classification, packet steering, encapsulation, security, quality-of-service, etc.). Illustratively, each AFU 210 may be configured by a user of the computing device 102. Each AFU 210 may access data in the memory 132 using one or more virtual channels (VCs) that are backed by the coherent interconnect 124 and/or the non-coherent interconnect 126 using the FIU 204. In some embodiments, each internal workload of the AFU 210 may be coupled to a VC to provide optimum performance particular to each individual workload. Although illustrated in FIG. 2 as an FPGA 128 including multiple AFUs 210, it should be understood that in some embodiments the accelerator device 128 may be embodied an ASIC, coprocessor, or other accelerator that also includes one or more AFUs 210 to provide accelerated networking functions. In those embodiments, the AFUs 210 may be fixed-function or otherwise not user configurable.

Figure 3:
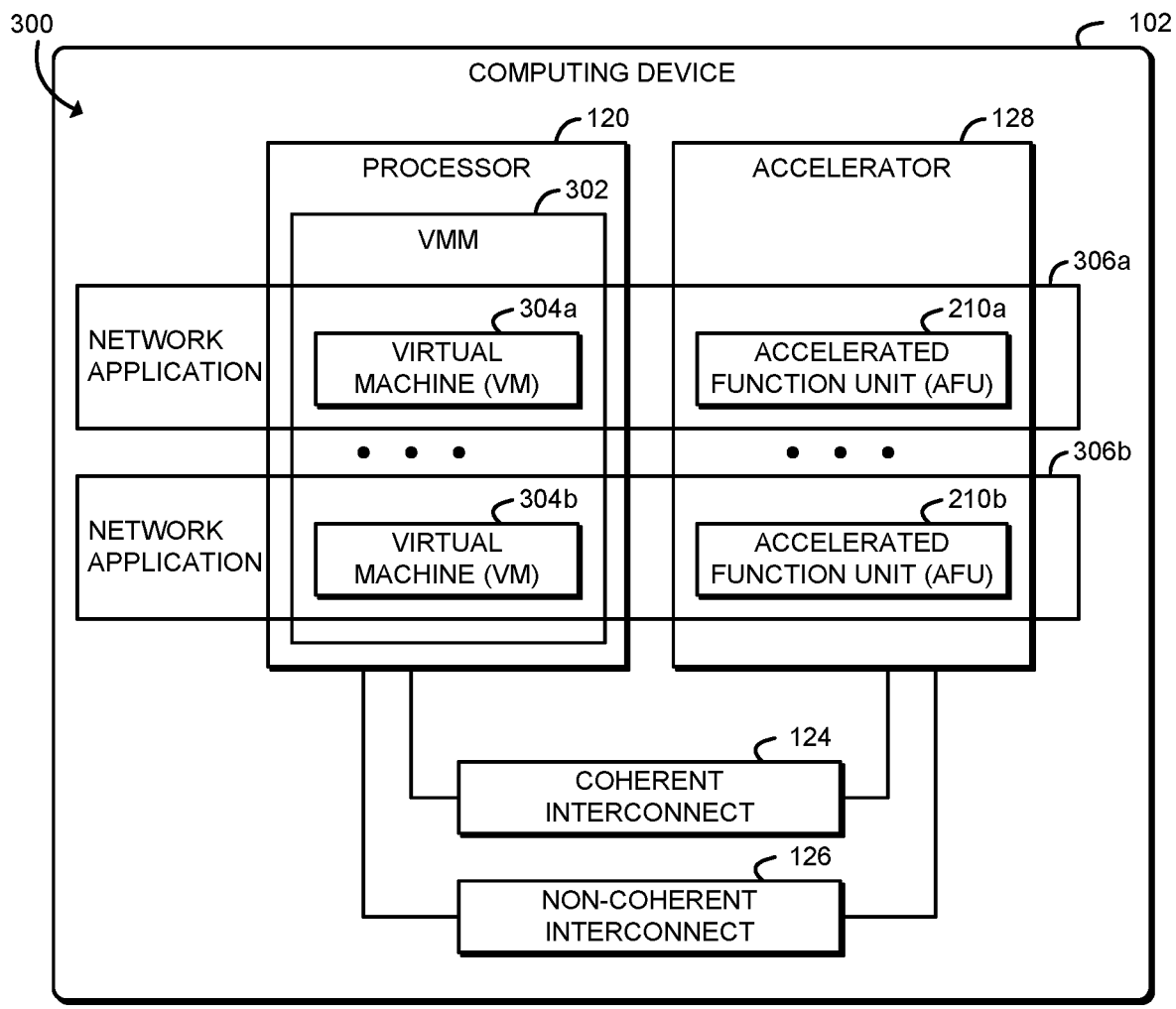
FIG. 3 is a simplified block diagram of at least one embodiment of an environment of the computing device of FIGS. 1 and 2.

Referring now to FIG. 3, in an illustrative embodiment, the computing device 102 establishes an environment 300 during operation. The illustrative environment 300 includes a virtual machine monitor (VMM) 302, one or more virtual machines (VMs) 304, and one or more network applications 306. As shown, the various components of the environment 300 may be embodied as hardware, firmware, software, or a combination thereof. As such, in some embodiments, one or more of the components of the environment 300 may be embodied as circuitry or collection of electrical devices (e.g., VMM circuitry 302, VM circuitry 304, and/or network application circuitry 306). It should be appreciated that, in such embodiments, one or more of the VMM circuitry 302, the VM circuitry 304, and/or the network application circuitry 306 may form a portion of the processor 120, the accelerator device 128, the I/O subsystem 130, and/or other components of the computing device 102. Additionally, in some embodiments, one or more of the illustrative components may form a portion of another component and/or one or more of the illustrative components may be independent of one another.

The VMM 302 may be embodied as any virtual machine monitor, hypervisor, or other component that allows virtualized workloads to be executed on the computing device 102. The VMM 302 may have complete control over the computing device 102, for example by executing in a non-virtualized host mode, such as ringlevel 0 and/or VMX-root mode. Each VM 304 may be embodied as any guest virtual machine, guest operating system, or other guest software configured to perform a virtualized workload on the computing device 102. For example, each VM 304 may be embodied as a virtual network function (VNF) or other network workload (e.g., user-designed custom data path logic such as forwarding, classification, packet steering, encapsulation, security, quality-of-service, etc.). As described further below, the VM 304 may offload certain workloads to a corresponding AFU 210 for acceleration. The VMM 302 may enforce isolation between the VMs 304 and otherwise enforce platform security. Thus, the computing device 102 may host guests executed by multiple users or other tenants.

As shown in FIG. 3, each network application 306 includes a corresponding VM 304 executed by the processor 120 as well as a corresponding AFU 210 of the accelerator device 128. The illustrative environment 300 includes two network applications 306a, 306b with corresponding VMs 304a, 304b and AFUs 210a, 210b; however, in other embodiments the environment 300 may include many network applications 306.

Each network application 306 may be configured to bind a VM 304 executed by the processor 120 with an AFU 210 of the accelerator device 128 via the coherent interconnect 124. The network application 306 is configured to process network application data with the VM 304 and the AFU 210 within a coherency domain maintained with the coherent interconnect 124. Processing the network application data may include communicating the network application data between the processor 120 and the accelerator device 128 via the coherent interconnect 124. Accordingly, binding the VM 304 and the AFU 210 may establish a communication session between the VM 304 and the AFU 210 using the coherent interconnect 124. In some embodiments, processing the network application data may include processing a packet of a network flow by the VM 304 (e.g., an initial packet or other packet that sets up the flow) and processing other packets of the network flow by the AFU 210 in response to processing the packet (e.g., processing subsequent packets in the flow by the AFU 210).

In some embodiments, the network application 306 may be further configured to program an FPGA 128 with the AFU 210. The VM 304 may be bound with the AFU 210 in response to programming the FPGA 128. In some embodiments, the network application 306 may be further configured to provision the VM 304 and request a virtual channel between the VM 304 and the AFU 210. The VM 304 may be bound with the AFU 210 in response to requesting the virtual channel. In some embodiments, the network application 306 may be configured to request a coherent virtual channel or a non-coherent virtual channel. The VM 304 may be bound to the AFU 210 via the coherent interconnect 124 in response to requesting a coherent virtual channel, and the VM 304 may be bound to the AFU 210 via the non-coherent interconnect 126 in response to requesting a non-coherent virtual channel. In some embodiments, the network application 306 may include an application hint with the request for the virtual channel, and the coherent interconnect 124 may be selected based on the application hint. In some embodiments, processing the network application data may include accessing the network application data by the AFU 210 via a load/store interface port of the FPGA 128. The load/store interface port of the FPGA 128 may communicate with the processor 120 via the coherent interconnect 124.

Figure 4:
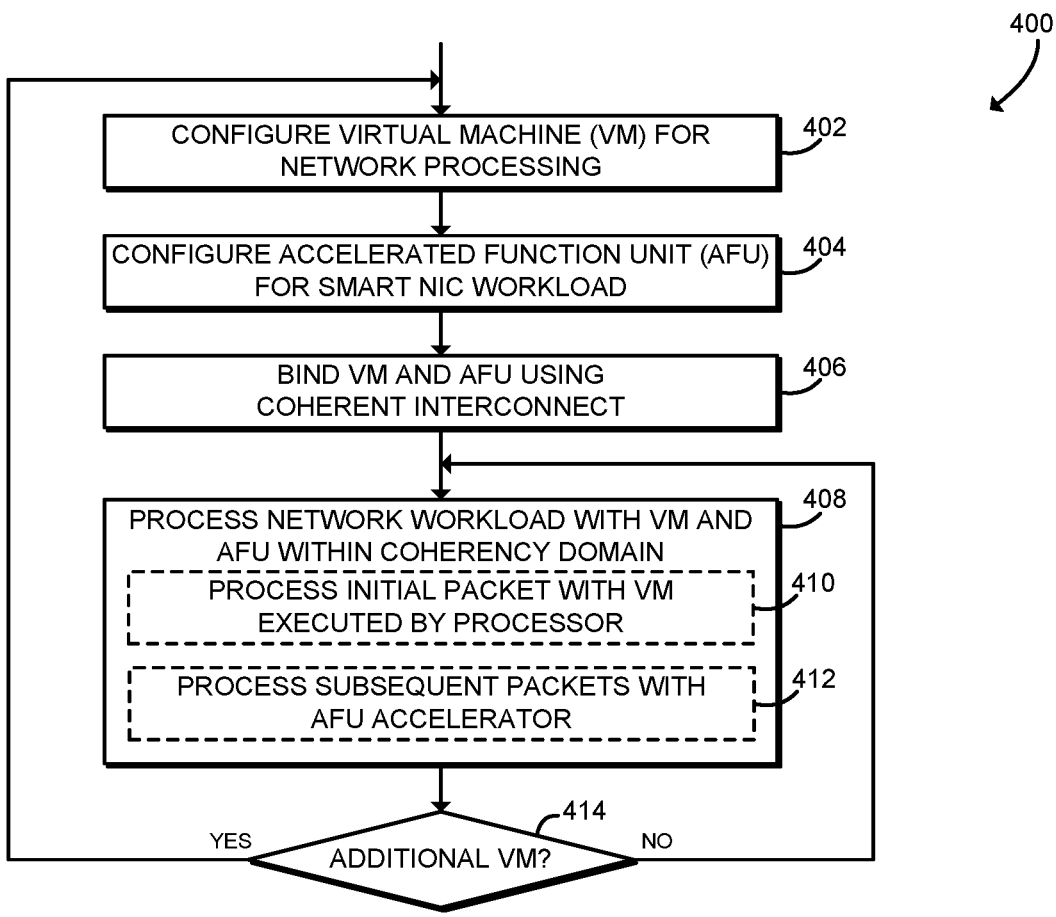
FIG. 4 is a simplified flow diagram of at least one embodiment of a method for application-specific network acceleration that may be executed by the computing device of FIGS. 1-3.

Referring now to FIG. 4, in use, the computing device 102 may execute a method 400 for application-specific network acceleration. It should be appreciated that, in some embodiments, the operations of the method 400 may be performed by one or more components of the environment 300 of the computing device 102 as shown in FIG. 3. The method 400 begins in block 402, in which the computing device 102 configures a virtual machine (VM) 304 for network processing. In block 404, the computing device 102 configures a corresponding AFU 210 for a smart network interface controller (NIC) workload. The smart NIC workload may include one or more workloads, such as a DMA workload, a virtual I/O RX/TX workload, a classifier workload, a forwarding information base lookup workload, a switch workload, a QoS workload, and/or other custom network function workloads.

In block 406, the computing device 102 binds the virtual machine 304 and the AFU 210 using the coherent interconnect 124. For example, one or more virtual I/O ports of the VM 304 may be bound to the AFU 210 using the coherent interconnect 124. The smartNIC components of the accelerator device 128 may implement smartNIC/Open Virtual Switch (OVS) acceleration that transports data packets back and forth between virtual I/O queues (RX/TX) and the smartNIC/OVS accelerator workloads. Although illustrated as using only the coherent interconnect 124, it should be understood that in some embodiments a VM 304 may also be bound to the AFU 210 using a non-coherent interconnect 126.

In block 408, the computing device 102 processes a network workload with the virtual machine 304 and the AFU 210 within the same coherency domain. The VM 304 and the AFU 210 may process network data concurrently, simultaneously, or otherwise, with the coherent interconnect 124 providing data coherency between the last-level cache of the processor 120, cache or other local memory of the accelerator device 128, and the memory 132. In some embodiments, full packet frames may be transferred between the processor 120 and the accelerator device 128, so that multiple switching actions can happen simultaneously. In some embodiments, in block 410 the computing device 102 may process an packet of a network flow with the virtual machine 304, executed by the processor 120. For example, the computing device 102 may process the initial packet of the network flow with the VM 304. In some embodiments, in block 412 the computing device 102 may process other packets in the network flow using the AFU 210 of the accelerator device 128. For example, the computing device 102 may process subsequent packets in the network flow with the accelerator device 128. The I/O subsystem 130 is capable of inline coupling with the coherency domain via the accelerator device 128, allowing the AFU 210 to process those packets without the involvement of the processor 120. Processing network flows in the same coherency domains may improve latency issues for flows processed by both the processor 120 and the accelerator device 128, especially for short-lived flows.

In block 414, the computing device 102 determines whether to provision additional virtual machines 304 and corresponding AFUs 210. If not, the method 400 loops back to block 408 to continue processing network packets with the provisioned VMs 304 and AFUs 210. If the computing device 102 determines to provision additional virtual machines 304 and corresponding AFUs 210, the method 400 loops back to block 402.

Figure 5:
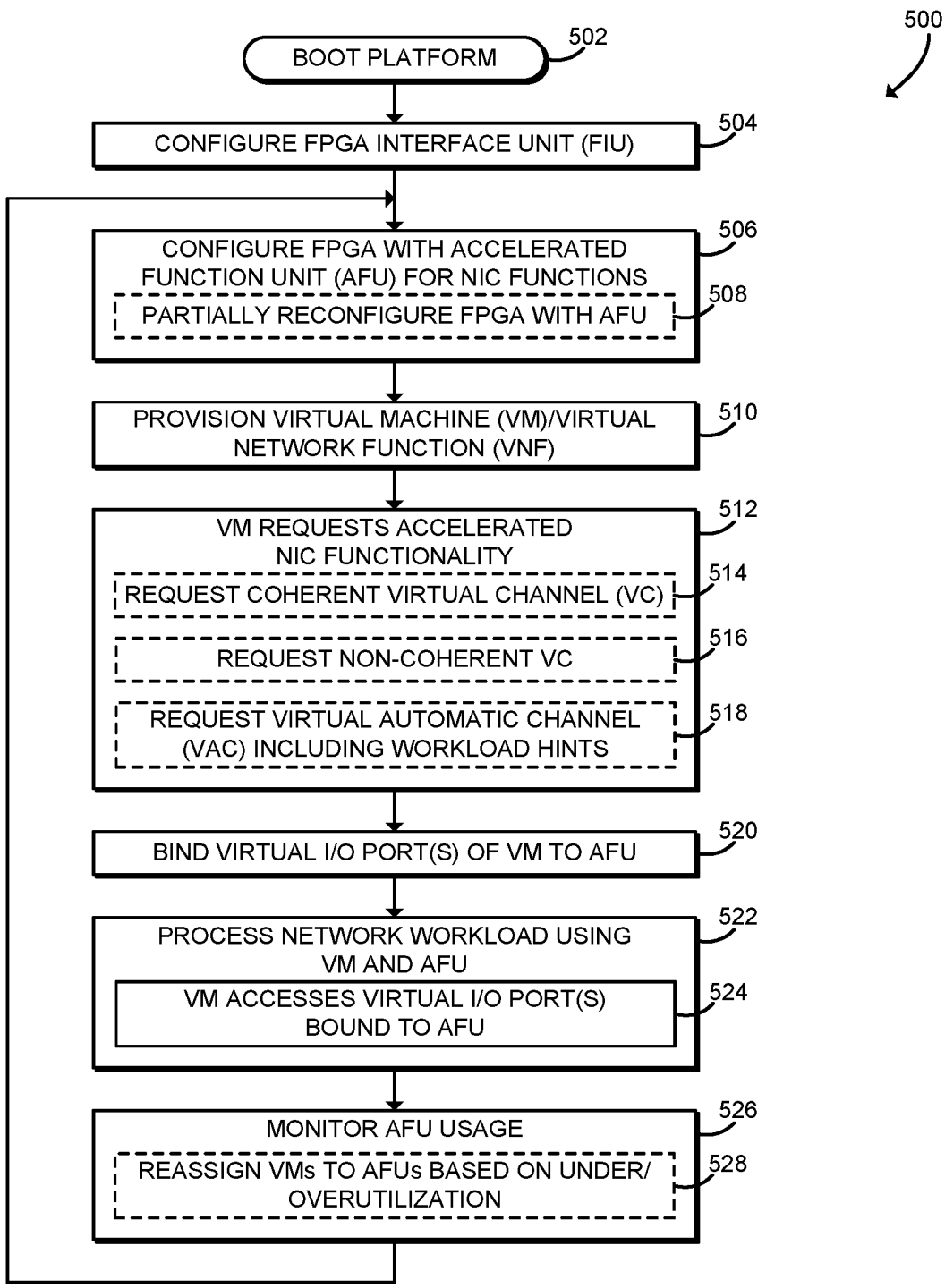
FIG. 5 is a simplified flow diagram of at least one embodiment of a method for application-specific network acceleration that may be executed by a processor of the computing device of FIGS. 1-3.

Referring now to FIG. 5, in use, the computing device 102 may execute a method 500 for application-specific network acceleration with the processor 120. It should be appreciated that, in some embodiments, the operations of the method 500 may be performed by one or more components of the environment 300 of the computing device 102 as shown in FIG. 3. The method 500 begins in block 502, in which the computing device 102 boots. In the illustrative embodiment, the computing device 102 may include an FPGA accelerator device 128.

In block 504, the computing device 102 configures the FPGA interface unit (FIU) 204 of the FPGA 128. As described above, the FIU 204 may be embodied as digital logic resources that are configured by a manufacturer, vendor, or other entity associated with the computing device 102. The FIU 204 may be configured at boot time and remain resident in the FPGA 128 to manage access to system buses (e.g., the coherent interconnect 124 and the non-coherent interconnect 126).

In block 506, the computing device 102 configures the FPGA 128 with an AFU 210 for NIC functions. For example, the AFU 210 may be configured with a smart NIC workload including one or more workloads such as a DMA workload, a virtual I/O RX/TX workload, a classifier workload, a forwarding information base lookup workload, a switch workload, a QoS workload, and/or other custom network function workloads. In those embodiments, the AFU 210 may be an inline smart NIC that is capable of processing network data received by the FPGA 128 without first passing through the processor 120. Thus, in those embodiments the AFU 210 may improve packet processing latency or otherwise improve network performance. In some embodiments, in block 508, the computing device 102 may partially reconfigure the FPGA 128 with the AFU 210.

In block 510, the computing device 102 provisions a VM 304. The VM 304 may be embodied as or otherwise perform one or more virtual network functions (VNFs). As described above, the VM 304 may be embodied as a VNF or other network workload (e.g., user-designed custom data path logic such as forwarding, classification, packet steering, encapsulation, security, quality-of-service, etc.).

In block 512, the VM 304 requests accelerated NIC functionality. In particular, the VM 304 may request to offload one or more network processing functions to an AFU 210 of the accelerator device 128. Depending on workload, the VM 304 may request coherent or non-coherent data transfers between the processor 120, FPGA 128, and memory 132. In some embodiments, in block 514 the VM 304 may request a coherent virtual channel (VC) between the VM 304 and the AFU 210. For example, a VM 304 with a need for deterministic acceleration (e.g., to perform virtual switching image processing, voice over IP communications with a quality of service requirement, industrial control, or other high-performance or real time application) may request a coherent VC. In some embodiments, in block 516, the VM 304 may request a non-coherent VC. For example, a VM 304 that does not need deterministic acceleration may request a non-coherent VC.

In some embodiments, in block 518, the VM 304 may request a virtual automatic channel (VAC). A VAC may combine acceleration requests to use all physical buses for optimizing bandwidth. The VAC channel may be optimized for maximum workload bandwidth. The FIU 204 VC steering mechanism may determine which physical interconnects 124, 126 to use based on one or more VAC criteria. The VAC criteria may include a caching hint, a data payload size, and/or a link utilization. Cacheable requests may be biased toward the coherent interconnect 124 (e.g., UPI 206). Data payload size of 64 bytes or otherwise equal to a cache line may be biased toward the coherent interconnect 124 (e.g., UPI 206). A multi-cache-line read or write may not be split between multiple VCs, so that read or write may be guaranteed to be processed by a single physical link. Link utilization may be used to balance load across all of the coherent and non-coherent VCs. The VM 304 may include one or more VAC criteria as workload hints in the acceleration request.

In block 520, the computing device 102 binds one or more virtual I/O ports of the VM 304 to the AFU 210. The VM 304 may communicate network data with the AFU 210 using the virtual I/O ports. As described further below, the smartNIC accelerator components of the AFU 210 may provide a configuration interface for software to specify the address of the virtual I/O queues and mapping tables for memory regions containing packet buffers. The smartNIC accelerator components may couple the virtual I/O queues to access and to parse a virtual I/O queue data structure in system main memory 132, to retrieve packet buffers from system memory 132 and to transmit packet buffers to system DRAM (e.g., the memory 132).

In block 522, the computing device 102 processes a network workload using the VM 304 and the AFU 210. As described above, the VM 304 may process network data (e.g., packet frames) in memory concurrently, simultaneously, or otherwise, with respect to the AU 210. In block 524, the VM 304 accesses the virtual I/O port(s) bound to the AFU 210. The VM 304 may read and/or write network packet buffers in system memory 132 corresponding to the virtual I/O ports. In response to accessing the virtual I/O ports, network data may be exchanged with the AFU 210 via the coherent interconnect 124 and/or the non-coherent interconnect 126 as previously configured in connection with blocks 512, 520.

In some embodiments, in block 526 the computing device 102 may monitor AFU 210 usage. For example, the computing device 102 may determine whether any AFUs 210 of the accelerator device 128 have unused capacity or if any AFUs 210 are oversubscribed. In some embodiments, in block 528 the computing device 102 may reassign one or more VMs 304 to different AFUs 210 based on under or overutilization. After monitoring the AFU 210 usage, the method 500 loops back to block 506 to continue configuring AFUs 210 and processing network data.

Figure 6:
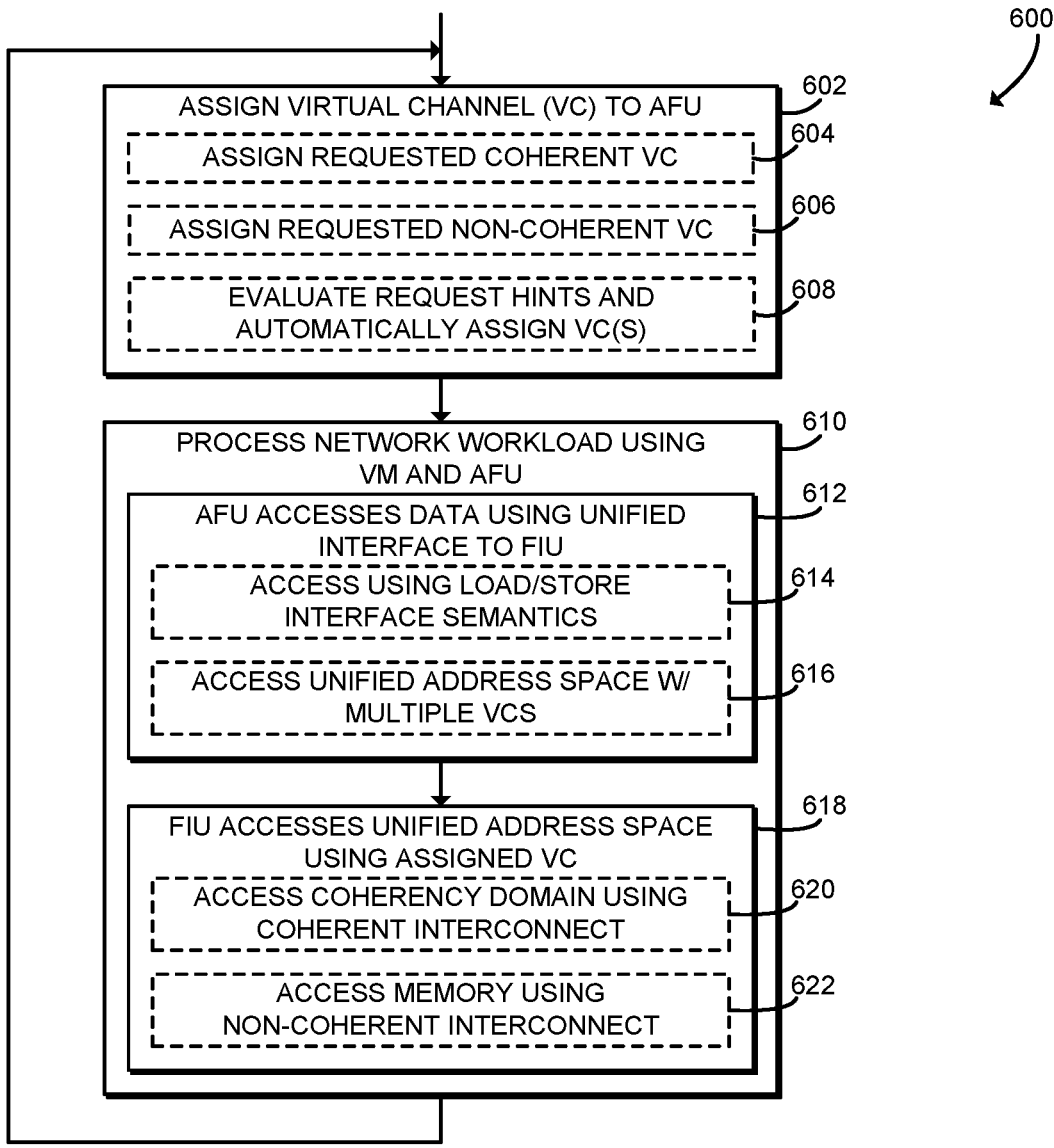
FIG. 6 is a simplified flow diagram of at least one embodiment of a method for application-specific network acceleration that may be executed by an accelerator device of the computing device of FIGS. 1-3.

Referring now to FIG. 6, in use, the computing device 102 may execute a method 600 for application-specific network acceleration with the accelerator device 128. It should be appreciated that, in some embodiments, the operations of the method 600 may be performed by one or more components of the environment 300 of the computing device 102 as shown in FIG. 3. The method 600 begins in block 602, in which the computing device 102 assigns a virtual channel (VC) to an AFU 210. In some embodiments, in block 604 the computing device 102 may assign a requested coherent VC. In some embodiments, in block 606 the computing device 102 may assign a requested non-coherent VC. In some embodiments, in block 608 the computing device 102 may evaluate one or more workload hints included with the request and automatically assign one or more VCs to the AFU 210. In some embodiments, the VC may be assigned based on caching hints, data payload size, and/or interconnect link utilization.

In block 610, the computing device 102 processes a network workload using a VM 304 and the AFU 210. As described above, the AFU 210 may process network data (e.g., packet frames) in memory concurrently, simultaneously, or otherwise, with respect to the VM 304. The smartNIC accelerator components may provide a configuration interface for software to specify the address of the virtual I/O queues and mapping tables for memory regions containing packet buffers. The smartNIC accelerator components may couple the virtual I/O queues to access and to parse a virtual I/O queue data structure in system main memory 132, to retrieve packet buffers from system memory 132 and to transmit packet buffers to system DRAM (e.g., the memory 132). The smartNIC accelerator components may also deliver a hardware interface to couple with other smartNIC/OVS workloads (e.g., classifier, forward information base lookup) so each workload can interface and handle related packets.

In block 612, the AFU 210 accesses network data using a unified interface to the FIU 204. For example, the FPGA 128 may include a programmable core cache interface (CCI-P), which may be embodied as a hardware-side signaling interface that provides an abstraction of the physical links between the FPGA 128 and the processor 120 of the MCP 202 (e.g., the coherent interconnect 124 and the non-coherent interconnect 126). The CCI-P may transfer data payloads with sizes of up to multiple cache lines. The smartNIC accelerator components may couple the CCI-P interface of the FIU 204 to a high performance DMA engine. In some embodiments, the CCI-P may provide access to two types of memory, the main memory 132 and an I/O memory. The main memory may be exposed to the VMM 302, operating system, or other software of the computing device 102 and accessible direct from the AFU 210, and the I/O memory requests may originate from the AFU 210 using MMIO as defined by the CCI-P. In some embodiments, in block 614, the AFU 210 may access the FIU 204 using load/store interface semantics. In some embodiments, in block 616, the AFU 210 may access a unified address space with multiple VCs.

In block 618, in response to accessing the FIU 204, the FIU 204 accesses the unified address space using one or more assigned VCs. Thus, the AFU 210 may maintain a single view of the system address space. In other words, a write to a particular address reaches the same cache line regardless of whether it travels via the coherent interconnect 124 or the non-coherent interconnect 126. In some embodiments, in block 620 the FIU 204 may access a coherency domain using the coherent interconnect 124. For example, the FIU 204 may communicate data with the processor 120 over an UltraPath Interconnect (UPI) coherent interconnect 124. The FIU 204 may implement a cache controller and a coherent caching agent (CA). The CA may make read and write requests to the coherent system memory 132, and may service snoop requests to an FIU FPGA cache. In some embodiments, in block 622 the FIU 204 may access the system memory 132 using the non-coherent interconnect 126, such as a PCIe bus. After processing the network workload, the method 600 loops back to block 602 to continue assigning VCs and processing network workloads.

It should be appreciated that, in some embodiments, the methods 400, 500, and/or 600 may be embodied as various instructions stored on a computer-readable media, which may be executed by the processor 120, the accelerator device 128, and/or other components of the computing device 102 to cause the computing device 102 to perform the method 400, 500, and/or 600, respectively. The computer-readable media may be embodied as any type of media capable of being read by the computing device 102 including, but not limited to, the memory 132, the data storage device 134, firmware devices, other memory or data storage devices of the computing device 102, portable media readable by a peripheral device 138 of the computing device 102, and/or other media.

EXAMPLES

Illustrative examples of the technologies disclosed herein are provided below. An embodiment of the technologies may include any one or more, and any combination of, the examples described below.

Example 1 includes a computing device for network data processing, the computing device comprising: a processor; an accelerator device; a coherent interconnect, wherein the processor and the accelerator device are coupled via the coherent interconnect; and a network application to (i) bind a virtual machine executed by the processor with an application function unit of the accelerator device via the coherent interconnect and (ii) process network application data with the virtual machine and the application function unit within a coherency domain maintained with the coherent interconnect in response to binding of the virtual machine with the application function unit.

Example 2 includes the subject matter of Example 1, and wherein to process the network application data comprises to: process, by the virtual machine, a first packet of a network flow; and process, by the application function unit, a second packet of the network flow in response to processing the first packet.

Example 3 includes the subject matter of any of Examples 1 and 2, and wherein to process the network application data comprises to communicate the network application data between the processor and the accelerator device via the coherent interconnect.

Example 4 includes the subject matter of any of Examples 1-3, and wherein the accelerator device comprises an application-specific integrated circuit.

Example 5 includes the subject matter of any of Examples 1-4, and wherein the accelerator device comprises a field programmable gate array.

Example 6 includes the subject matter of any of Examples 1-5, and wherein: the network application is further to program the field-programmable gate array with the application function unit; and to bind the virtual machine with the application function unit comprises to bind the virtual machine with the application function unit in response to programming of the field-programmable gate array.

Example 7 includes the subject matter of any of Examples 1-6, and wherein the computing device comprises a multi-chip package, wherein the multi-chip package comprises the processor and the field-programmable gate array.

Example 8 includes the subject matter of any of Examples 1-7, and wherein: the network application is further to (i) provision the virtual machine and (ii) request a virtual channel between the virtual machine and the application function unit in response to provisioning of the virtual machine; and to bind the virtual machine with the application function unit comprises to bind the virtual machine with the application function unit in response to a request of the virtual channel.

Example 9 includes the subject matter of any of Examples 1-8, and wherein to request the virtual channel comprises to request a coherent virtual channel.

Example 10 includes the subject matter of any of Examples 1-9, and wherein: to request the virtual channel comprises to request a virtual channel with an application hint; and to bind the virtual machine with the application function unit comprises to select the coherent interconnect based on the application hint.

Example 11 includes the subject matter of any of Examples 1-10, and wherein to process the network application data with the virtual machine and the application function unit comprises to: access, by the application function unit, the network application data via a load/store interface port of the field programmable gate array; and communicate, by the load/store interface port of the field programmable gate array, with the processor via the coherent interconnect in response to an access of the network application data.

Example 12 includes the subject matter of any of Examples 1-11, and wherein: to request the virtual channel comprises to request a coherent virtual channel or a non-coherent virtual channel; and to bind the virtual machine with the application function unit comprises to bind the virtual machine with the application function unit via the coherent interconnect in response to a request of a coherent virtual channel and to bind the virtual machine with the application function unit via a non-coherent interconnect in response to a request of a non-coherent virtual channel.

Example 13 includes a method for network data processing, the method comprising: binding, by a computing device, a virtual machine executed by a processor of the computing device with an application function unit of an accelerator device of the computing device via a coherent interconnect; and processing, by the computing device, network application data with the virtual machine and the application function unit within a coherency domain maintained with the coherent interconnect in response to binding the virtual machine with the application function unit.

Example 14 includes the subject matter of Example 13, and wherein processing the network application data comprises processing, by the virtual machine, a first packet of a network flow; and processing, by the application function unit, a second packet of the network flow in response to processing the first packet.

Example 15 includes the subject matter of any of Examples 13 and 14, and wherein processing the network application data comprises communicating the network application data between the processor and the accelerator device via the coherent interconnect.

Example 16 includes the subject matter of any of Examples 13-15, and wherein the accelerator device comprises an application-specific integrated circuit.

Example 17 includes the subject matter of any of Examples 13-16, and wherein the accelerator device comprises a field programmable gate array.

Example 18 includes the subject matter of any of Examples 13-17, and further comprising programming, by the computing device, the field-programmable gate array with the application function unit; wherein binding the virtual machine with the application function unit comprises binding the virtual machine with the application function unit in response to programming the field-programmable gate array.

Example 19 includes the subject matter of any of Examples 13-18, and wherein the computing device comprises a multi-chip package, wherein the multi-chip package comprises the processor and the field-programmable gate array.

Example 20 includes the subject matter of any of Examples 13-19, and further comprising provisioning, by the computing device, the virtual machine; and requesting, by the computing device, a virtual channel between the virtual machine and the application function unit in response to provisioning the virtual machine; wherein binding the virtual machine with the application function unit comprises binding the virtual machine with the application function unit in response to requesting the virtual channel.

Example 21 includes the subject matter of any of Examples 13-20, and wherein requesting the virtual channel comprises requesting a coherent virtual channel.

Example 22 includes the subject matter of any of Examples 13-21, and wherein requesting the virtual channel comprises requesting a virtual channel with an application hint; and binding the virtual machine with the application function unit comprises selecting the coherent interconnect based on the application hint.

Example 23 includes the subject matter of any of Examples 13-22, and wherein processing the network application data with the virtual machine and the application function unit comprises: accessing, by the application function unit, the network application data via a load/store interface port of the field programmable gate array; and communicating, by the load/store interface port of the field programmable gate array, with the processor via the coherent interconnect in response to accessing of the network application data.

Example 24 includes the subject matter of any of Examples 13-23, and wherein requesting the virtual channel comprises requesting a coherent virtual channel or a non-coherent virtual channel; and binding the virtual machine with the application function unit comprises binding the virtual machine with the application function unit via the coherent interconnect in response to requesting a coherent virtual channel and binding the virtual machine with the application function unit via a non-coherent interconnect in response to requesting a non-coherent virtual channel.

Example 25 includes a computing device comprising a processor; and a memory having stored therein a plurality of instructions that when executed by the processor cause the computing device to perform the method of any of Examples 13-24.

Example 26 includes one or more non-transitory, computer readable storage media comprising a plurality of instructions stored thereon that in response to being executed result in a computing device performing the method of any of Examples 13-24.

Example 27 includes a computing device comprising means for performing the method of any of Examples 13-24.

Example 28 includes a computing device for network data processing, the computing device comprising: means for binding a virtual machine executed by a processor of the computing device with an application function unit of an accelerator device of the computing device via a coherent interconnect; and means for processing network application data with the virtual machine and the application function unit within a coherency domain maintained with the coherent interconnect in response to binding the virtual machine with the application function unit.

Example 29 includes the subject matter of Example 28, and wherein the means for processing the network application data comprises means for processing, by the virtual machine, a first packet of a network flow; and means for processing, by the application function unit, a second packet of the network flow in response to processing the first packet.

Example 30 includes the subject matter of any of Examples 28 and 29, and wherein the means for processing the network application data comprises means for communicating the network application data between the processor and the accelerator device via the coherent interconnect.

Example 31 includes the subject matter of any of Example 28-30, and wherein the accelerator device comprises an application-specific integrated circuit.

Example 32 includes the subject matter of any of Example 28-31, and wherein the accelerator device comprises a field programmable gate array.

Example 33 includes the subject matter of any of Example 28-32, and further comprising means for programming the field-programmable gate array with the application function unit; wherein the means for binding the virtual machine with the application function unit comprises means for binding the virtual machine with the application function unit in response to programming the field-programmable gate array.

Example 34 includes the subject matter of any of Example 28-33, and wherein the computing device comprises a multi-chip package, wherein the multi-chip package comprises the processor and the field-programmable gate array.

Example 35 includes the subject matter of any of Example 28-34, and further comprising means for provisioning the virtual machine; and means for requesting a virtual channel between the virtual machine and the application function unit in response to provisioning the virtual machine; wherein the means for binding the virtual machine with the application function unit comprises means for binding the virtual machine with the application function unit in response to requesting the virtual channel.

Example 36 includes the subject matter of any of Example 28-35, and wherein the means for requesting the virtual channel comprises means for requesting a coherent virtual channel.

Example 37 includes the subject matter of any of Example 28-36, and wherein the means for requesting the virtual channel comprises means for requesting a virtual channel with an application hint; and the means for binding the virtual machine with the application function unit comprises means for selecting the coherent interconnect based on the application hint.

Example 38 includes the subject matter of any of Example 28-37, and wherein the means for processing the network application data with the virtual machine and the application function unit comprises: means for accessing, by the application function unit, the network application data via a load/store interface port of the field programmable gate array; and means for communicating, by the load/store interface port of the field programmable gate array, with the processor via the coherent interconnect in response to accessing of the network application data.

Example 39 includes the subject matter of any of Example 28-38, and wherein the means for requesting the virtual channel comprises means for requesting a coherent virtual channel or a non-coherent virtual channel; and the means for binding the virtual machine with the application function unit comprises means for binding the virtual machine with the application function unit via the coherent interconnect in response to requesting a coherent virtual channel and means for binding the virtual machine with the application function unit via a non-coherent interconnect in response to requesting a non-coherent virtual channel.

The invention claimed is:

1. A computing device for network data processing, the computing device comprising:
a processor;
an accelerator device;
a coherent interconnect, wherein the processor and the accelerator device are coupled via the coherent interconnect, wherein the coherent interconnect maintains a coherency domain that includes the processor and the accelerator device, wherein the coherency domain includes a unified shared address space;
a multi-chip package, the multi-chip package including the processor, the accelerator device, and the coherent interconnect, the multi-chip package including a physical package containing a plurality of integrated circuits including the processor and the accelerator device; and
a network application to (i) provision a virtual machine executed by the processor (ii) request a virtual channel between the virtual machine and an application function unit of the accelerator device, the request to include an application hint (iii) in response to the request for a virtual channel, bind the virtual machine with the application function unit of the accelerator device via the coherent interconnect, wherein the coherent interconnect is selected based on the application hint and (iv) process network application data with the virtual machine and the application function unit within the coherency domain maintained with the coherent interconnect in response to binding of the virtual machine with the application function unit.

2. The computing device of claim 1, wherein to process the network application data, the network application is to:
process, by the virtual machine, a first packet of a network flow; and process, by the application function unit, a second packet of the network flow in response to processing the first packet.

3. The computing device of claim 1, wherein the network application is to communicate the network application data between the processor and the accelerator device via the coherent interconnect.

4. The computing device of claim 1, wherein the accelerator device includes an application-specific integrated circuit.

5. The computing device of claim 1, wherein the accelerator device includes a field-programmable gate array.

6. The computing device of claim 5, wherein:
the network application is further to program the field-programmable gate array with the application function unit; and
to bind the virtual machine with the application function unit, the network application is to bind the virtual machine with the application function unit in response to programming of the field-programmable gate array.

7. The computing device of claim 1, wherein to request the virtual channel includes to request a coherent virtual channel.

8. The computing device of claim 1, wherein to process the network application data with the virtual machine and the application function unit includes to:
access, by the application function unit, the network application data via a load/store interface port of the field-programmable gate array; and
communicate, by the load/store interface port of the field-programmable gate array, with the processor via the coherent interconnect in response to an access of the network application data.

9. The computing device of claim 1, wherein:
to request the virtual channel includes to request a coherent virtual channel or a non-coherent virtual channel; and
to bind the virtual machine with the application function unit includes to bind the virtual machine with the application function unit via the coherent interconnect in response to a request of a coherent virtual channel and to bind the virtual machine with the application function unit via a non-coherent interconnect in response to a request of a non-coherent virtual channel.

10. A method for network data processing, the method comprising:
provisioning, by a computing device, a virtual machine executed by a processor of the computing device;
requesting, by the computing device, a virtual channel between the virtual machine and an application function unit of an accelerator device, the request including an application hint;
in response to the request for a virtual channel, binding, by the computing device, the virtual machine with the application function unit of the accelerator device via a coherent interconnect, the coherent interconnect selected based on the application hint, wherein the coherent interconnect maintains a coherency domain that includes the processor and the accelerator device, wherein the coherency domain includes a unified shared address space, and wherein the processor, the accelerator device, and the coherent interconnect are included in a multi-chip package of the computing device, wherein the multi-chip package includes a physical package containing a plurality of integrated circuits, wherein the plurality of integrated circuits includes the processor and the accelerator device; and
processing, by the computing device, network application data with the virtual machine and the application function unit within the coherency domain maintained with the coherent interconnect in response to binding the virtual machine with the application function unit.

11. The method of claim 10, wherein the processing of the network application data includes:
processing, by the virtual machine, a first packet of a network flow; and processing, by the application function unit, a second packet of the network flow in response to processing the first packet.

12. The method of claim 10, wherein the processing of the network application data includes communicating the network application data between the processor and the accelerator device via the coherent interconnect.

13. One or more non-transitory, computer-readable storage media comprising a plurality of instructions that, in response to being executed, cause a computing device to:
provision a virtual machine executed by a processor of the computing device;
request a virtual channel between the virtual machine and an application function unit of an accelerator device, the request including an application hint;
in response to the request for a virtual channel, bind the virtual machine with the application function unit of the accelerator device via a coherent interconnect, wherein the coherent interconnect is selected based on the application hint wherein the coherent interconnect maintains a coherency domain that includes the processor and the accelerator device, wherein the coherency domain includes a unified shared address space, and wherein the processor, the accelerator device, and the coherent interconnect are included in a multi-chip package of the computing device, wherein the multi-chip package includes a physical package containing a plurality of integrated circuits, wherein the plurality of integrated circuits includes the processor and the accelerator device; and process network application data with the virtual machine and the application function unit within the coherency domain maintained with the coherent interconnect in response to binding the virtual machine with the application function unit.

14. The one or more non-transitory, computer-readable storage media of claim 13, wherein to process the network application data includes to:

process, by the virtual machine, a first packet of a network flow; and process, by the application function unit, a second packet of the network flow in response to processing the first packet.

15. The one or more non-transitory, computer-readable storage media of claim 13, wherein to process the network application data includes to communicate the network application data between the processor and the accelerator device via the coherent interconnect.

16. The one or more non-transitory, computer-readable storage media of claim 13, wherein the accelerator device includes a field-programmable gate array.

* * * * *